(12) United States Patent
Hillis et al.

(10) Patent No.: US 9,339,116 B2
(45) Date of Patent: May 17, 2016

(54) SYSTEMS, STRUCTURES AND PROCESSES WITH EMBEDDED RESISTANCE DEVICE

(75) Inventors: W. Daniel Hillis, Encino, CA (US); Lars Arnt Jangaard, West Hills, CA (US)

(73) Assignee: Applied Invention, LLC, Burbank, CA (US)

( * ) Notice: Subject to any disclaimer, the term of this patent is extended or adjusted under 35 U.S.C. 154(b) by 166 days.

(21) Appl. No.: 13/289,904

(22) Filed: Nov. 4, 2011

(65) Prior Publication Data

US 2012/0112922 A1 May 10, 2012

Related U.S. Application Data

(60) Provisional application No. 61/410,291, filed on Nov. 4, 2010.

(51) Int. Cl.
| | |
|---|---|
| *G08B 21/00* | (2006.01) |
| *A47C 7/72* | (2006.01) |
| *A47C 31/12* | (2006.01) |
| *G01L 1/22* | (2006.01) |
| *A63B 21/02* | (2006.01) |
| *A63B 71/06* | (2006.01) |

(52) U.S. Cl.
CPC .............. *A47C 7/72* (2013.01); *A47C 31/123* (2013.01); *A47C 31/126* (2013.01); *G01L 1/2218* (2013.01); *G01L 1/2287* (2013.01); *A63B 21/028* (2013.01); *A63B 2071/063* (2013.01); *A63B 2071/0625* (2013.01); *A63B 2071/0655* (2013.01); *A63B 2220/51* (2013.01)

(58) Field of Classification Search
CPC ...... A47C 7/72; A47C 31/123; A47C 31/126; A63B 21/028; A63B 2071/0625; A63B 2071/063; A63B 2071/0655; A63B 2220/51

USPC ........... 340/657, 665, 668, 677; 446/81, 175, 446/178, 183, 184, 198, 199, 484
See application file for complete search history.

(56) References Cited

U.S. PATENT DOCUMENTS

| | | | | |
|---|---|---|---|---|
| 4,656,070 | A | * | 4/1987 | Nyberg et al. ................. 138/141 |
| 4,748,433 | A | * | 5/1988 | Jackson et al. ..................... 338/6 |
| 4,820,236 | A | * | 4/1989 | Berliner et al. ............... 446/369 |
| 4,833,440 | A | * | 5/1989 | Wojtanek ...................... 338/114 |
| 4,905,574 | A | * | 3/1990 | Trevisan ........................ 92/69 R |
| 5,004,216 | A | * | 4/1991 | Boudreau ..................... 267/179 |

(Continued)

OTHER PUBLICATIONS

S. Jacoby, W. K. Sung and S. Hendren; Conductive Elastomers—Creating Material Interfaces—Fall 2011; Sep. 27, 2011; MIT Media Lab.

(Continued)

*Primary Examiner* — Hai Phan
*Assistant Examiner* — Royit Yu
(74) *Attorney, Agent, or Firm* — Michael A. Glenn; Perkins Coie LLP

(57) ABSTRACT

Enhanced devices, processes, and systems provide measurement of electrical resistance as a means for determining the intensity with which stress is applied to an object, such as but not limited to a toy, e.g. a stuffed toy. The induced strain resulting from such an applied stress may also be determined from the measurement of electrical resistance. One or more actions may preferably be taken in response to the determined stress or the resulting strain, such as but not limited to providing any of visual feedback, auditory feedback, haptic feedback, or a numerical readout.

31 Claims, 16 Drawing Sheets

(56) References Cited

U.S. PATENT DOCUMENTS

| | | | |
|---|---|---|---|
| 5,011,449 A * | 4/1991 | Handy et al. | 446/297 |
| 5,402,050 A * | 3/1995 | Ozawa | 318/568.12 |
| 5,878,620 A * | 3/1999 | Gilbert et al. | 73/172 |
| 6,053,797 A * | 4/2000 | Tsang et al. | 446/297 |
| 8,312,844 B2 * | 11/2012 | Mann | 119/709 |
| 2002/0130673 A1 * | 9/2002 | Pelrine et al. | 324/727 |
| 2003/0166374 A1 * | 9/2003 | Nelson et al. | 446/379 |
| 2004/0092120 A1 * | 5/2004 | Wicker | 438/710 |
| 2006/0162464 A1 * | 7/2006 | Hayashi et al. | 73/818 |
| 2007/0027495 A1 * | 2/2007 | Gerber | 607/41 |
| 2007/0222344 A1 * | 9/2007 | Kornbluh et al. | 310/800 |
| 2008/0102731 A1 * | 5/2008 | Sutton | 446/369 |
| 2009/0031800 A1 * | 2/2009 | Maekawa | 73/379.02 |
| 2009/0160813 A1 * | 6/2009 | Takashima et al. | 345/173 |
| 2009/0183579 A1 * | 7/2009 | Abe | 73/862.627 |
| 2009/0282671 A1 * | 11/2009 | Tao et al. | 29/621.1 |
| 2009/0286210 A1 * | 11/2009 | Spreen et al. | 434/112 |
| 2011/0117810 A1 * | 5/2011 | Morley et al. | 446/369 |

OTHER PUBLICATIONS

L. Fuller; MEMS Capacitor Sensor Laboratory; Apr. 9, 2008; Microelectronic Engineering, Rochester Institute of Technology.

* cited by examiner

SYSTEMS, STRUCTURES AND PROCESSES WITH EMBEDDED RESISTANCE DEVICE

CROSS REFERENCE TO RELATED APPLICATION AND CLAIM FOR PRIORITY

This Application claims priority to U.S. Provisional Patent Application No. 61/410,291, entitled Toy with Embedded Strain Measurement Device, filed 4 Nov. 2010, which is incorporated herein in its entirety by this reference thereto.

FIELD OF THE INVENTION

The present invention relates generally to the field of interactive structures and associated processes. More particularly, the present invention relates to systems, structures, and processes for interactive devices, such as but not limited to toys.

BACKGROUND OF THE INVENTION

The dramatic reduction in the cost and size of microcontrollers has led to their widespread adoption throughout the toy industry. In particular, many stuffed toys are now equipped with microcontrollers that provide an interactive experience for the owner. In many instances, the stuffed toy is further equipped with devices such as contact switches, e.g. momentary switches, or pressure sensors that can detect if and where a user is contacting the toy. Providing measurements from such devices to the microcontroller can allow the stuffed toy to more compellingly interact with the user. For example, the stuffed toy, e.g. a cat, can produce pre-recorded sounds, e.g. meowing, consistent with the user contact, e.g. stroking along the kitten's back.

Such sensors, however, generally acquire localized measurements. They may thus be ineffective or inaccurate in measuring the magnitude of a force applied uniformly across a substantial portion of the surface of the stuffed toy, e.g. when a user hugs a cat.

It would thus be advantageous to provide a simple and cost-effective mechanism for measuring the intensity of such user contacts. Such a mechanism would provide a substantial technical advance.

Furthermore, it would be advantageous to provide a structure, system and process for measuring the intensity of a force that is applied substantially uniformly across a substantial portion of the perimeter of an object, such as but not limited to a stuffed toy. Such a development would provide an additional technical advance.

SUMMARY OF THE INVENTION

Enhanced devices, processes, and systems provide measurement of electrical resistance as a means for determining the intensity with which stress is applied to an object, such as but not limited to a toy, e.g. a stuffed toy. The induced strain resulting from such an applied stress may also be determined from the measurement of electrical resistance. One or more actions may preferably be taken in response to the determined stress or the resulting strain, such as but not limited to providing any of visual feedback, auditory feedback, haptic feedback, or a numerical readout.

DETAILED DESCRIPTION OF PREFERRED EMBODIMENTS

Figure 1:
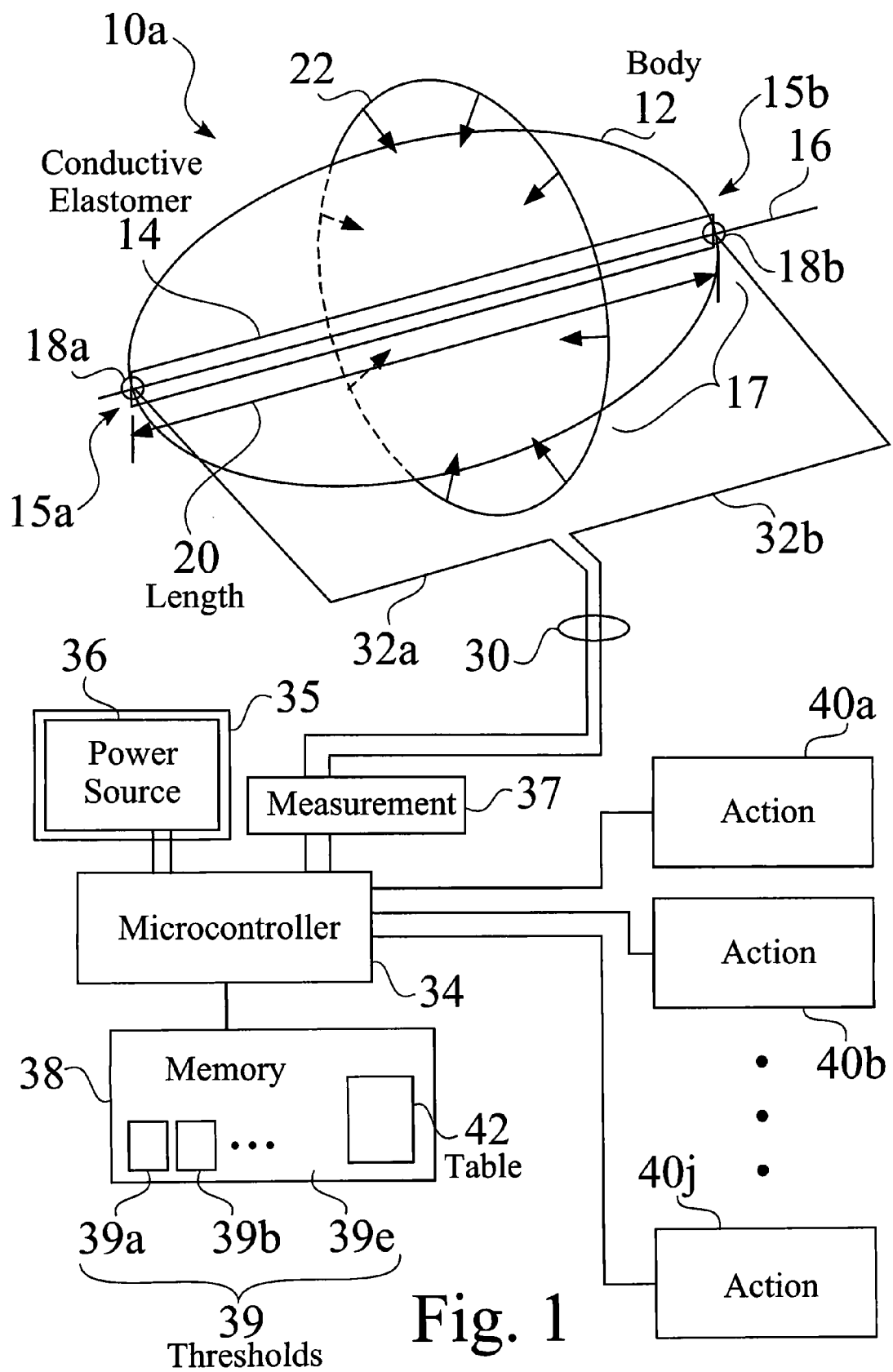
FIG. 1 is a schematic diagram of a system for measuring electrical resistance as a function of length of a structure, and for controllably taking one or more actions in response to the measured electrical resistance.

FIG. 1 is a schematic diagram of a system 10a for measuring 102 (FIG. 4) electrical resistance 124 (FIG. 5) as a function of the length 20 of a structure 14, and for controllably taking one or more actions 40, e.g. 40a-40j, in response to the measured resistance 124.

In some exemplary embodiments, the system 10, e.g. 10a, is associated with a stuffed toy 60 (FIG. 2), wherein the system 10 may preferably determine the intensity with which a user USR (FIG. 3) applies a radial stress 22 to the toy 60.

Figure 17:
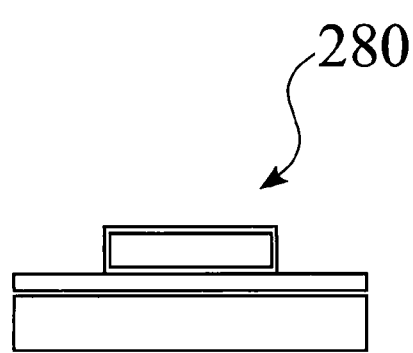
FIG. 17 is a schematic diagram of an enhanced scale having an associated strain measurement device.
Figure 18:
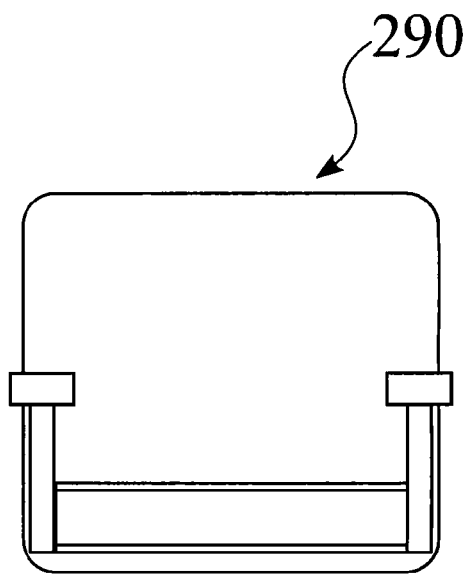
FIG. 18 is a schematic diagram of an enhanced cushion having an associated strain measurement device.

While exemplary embodiments are disclosed herein in association with a stuffed toy 60, the system 10 may alternately be configured for a wide variety of alternate applications, such as but not limited any of exercise mechanisms 10d (FIG. 15), other toys 10e (FIG. 16), scales 10f (FIG. 17), or cushions, mattresses or seats 10g (FIG. 18).

In the exemplary embodiment of the system 10a seen in FIG. 1, a body 12 extends from a first end 15a to a second end 15b opposite the first end 15a, and comprises an axis of distension 16 defined between the first end 15a and the second end 15b. A conductive elastomer 14 typically extends and is fixedly attached between the first end 15a and the second end 15b, such as between a first point 18a and a second point 18b.

A length 20 of the conductive elastomer 14 extends between the points of attachment 18a,18b, wherein the length 20 is changeable, such as in response to elongation of the body 12, e.g. along the axis of distension 16. As well, the electrical properties, e.g. the resistance 124 (FIG. 5), of the conductive elastomer 14 change as a function of the length 20, wherein the electrical resistance 124 may preferably be measured 102 (FIG. 4), and stored or compared to other resistance measurements 102, such as to yield a difference in electrical resistance 124, and may further be used to provide strain 142 (FIG. 6) or stress 152 (FIG. 7) values. One or more actions 40 may be taken, based on one or more of any of the resistance measurements 102, the determined strain values 142, or the determined stress values 152.

As seen in FIG. 1, the opposing ends of the conductive elastomer 14 are electrically connected 30, such as through respective leads 32a, 32b, to a measurement mechanism 37 associated with a microcontroller 34, e.g. comprising one or more processors, which is typically connectable to a power source 36, e.g. such as but not limited to a battery 36, which may preferably be located within a receptacle 35. A memory 38 may also be associated with the microcontroller 34. Any of the microcontroller 34, the power source 36, the measurement mechanism 37, or the memory 38 may be internal to a structure associated with the body 12, such as within a stuffed toy 60. As also seen in FIG. 1, one or more actions 40, e.g. 40a-40j, are typically controllable through the microcontroller 34, and may be responsive to user interaction with the body 12.

The exemplary body 12 seen in FIG. 1 may preferably comprise a generally ellipsoidal shape 17, having a volume that is compressible and/or elastic. For example, in response to an applied radial stress 22, e.g. a uniform pressure applied along a perimeter 86 (FIG. 3) of the toy 60, the toy 60 generally behaves in an elastic, volume-conserving manner, increasing 104 (FIG. 4) in length 20 along an axis 16 that is generally perpendicular to the plane of the radial stress 22.

Figure 6:
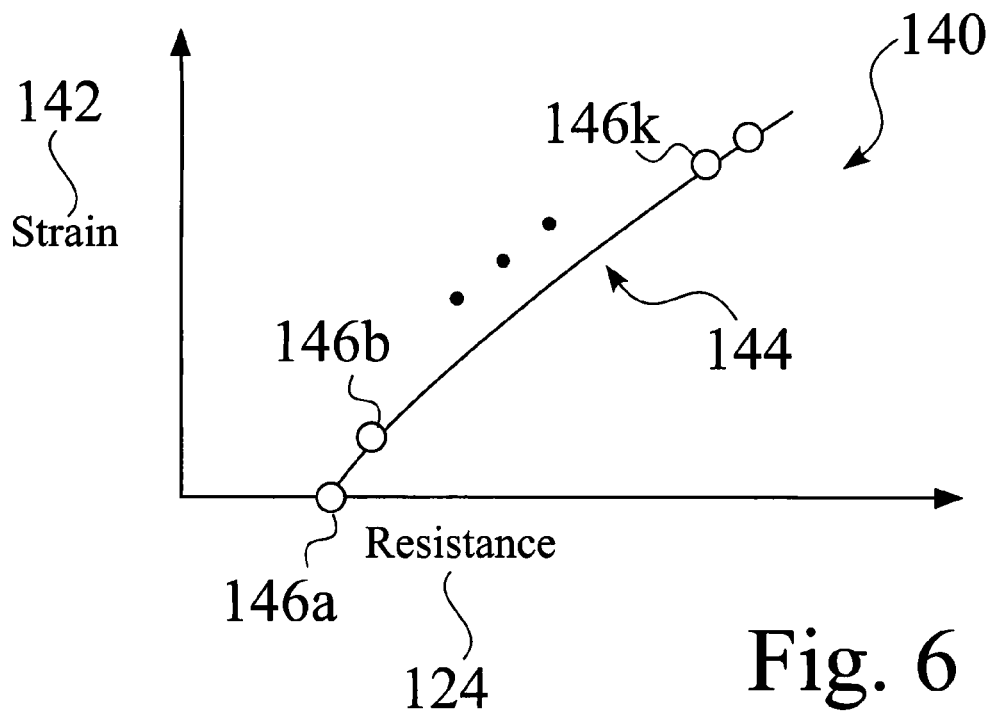
FIG. 6 is an exemplary graph that shows induced mechanical strain as a function of the electrical resistance for a conductive elastomer at different points of extension.
Figure 7:
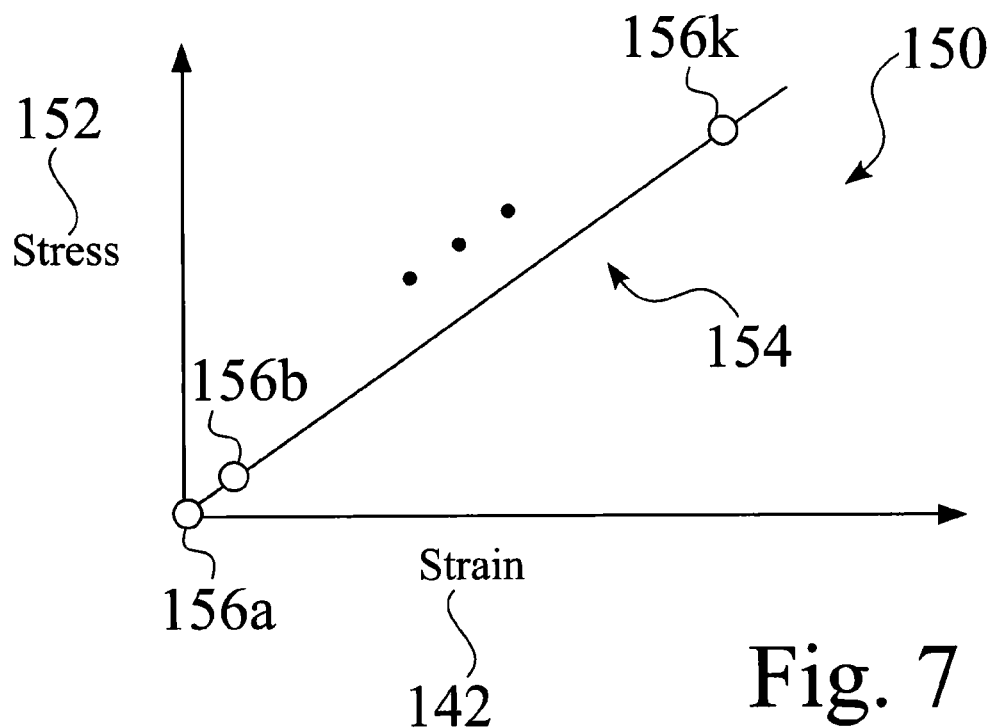
FIG. 7 is a chart that shows the relationship between induced mechanical stress and strain.

The system 10 typically measures 102 (FIG. 4) the change in electrical resistance 124 and determines the resulting strain 142 (FIG. 6) along the axis of distension 16, and from these quantities 124,142, the microcontroller 34 may determine the applied stress 152 (FIG. 7). The system 10 can therefore determine the intensity with which a user USR applies a radial stress 22 to the body 12, such as associated with a toy 60. In the disclosure herein, the radial stress 22 refers to the actual stress 22 applied to the body 12, while the determined stress 152 refers to the stress that comprises a determined value, such as using any of electrical resistance values 124 or determined strain values 142.

Figure 2:
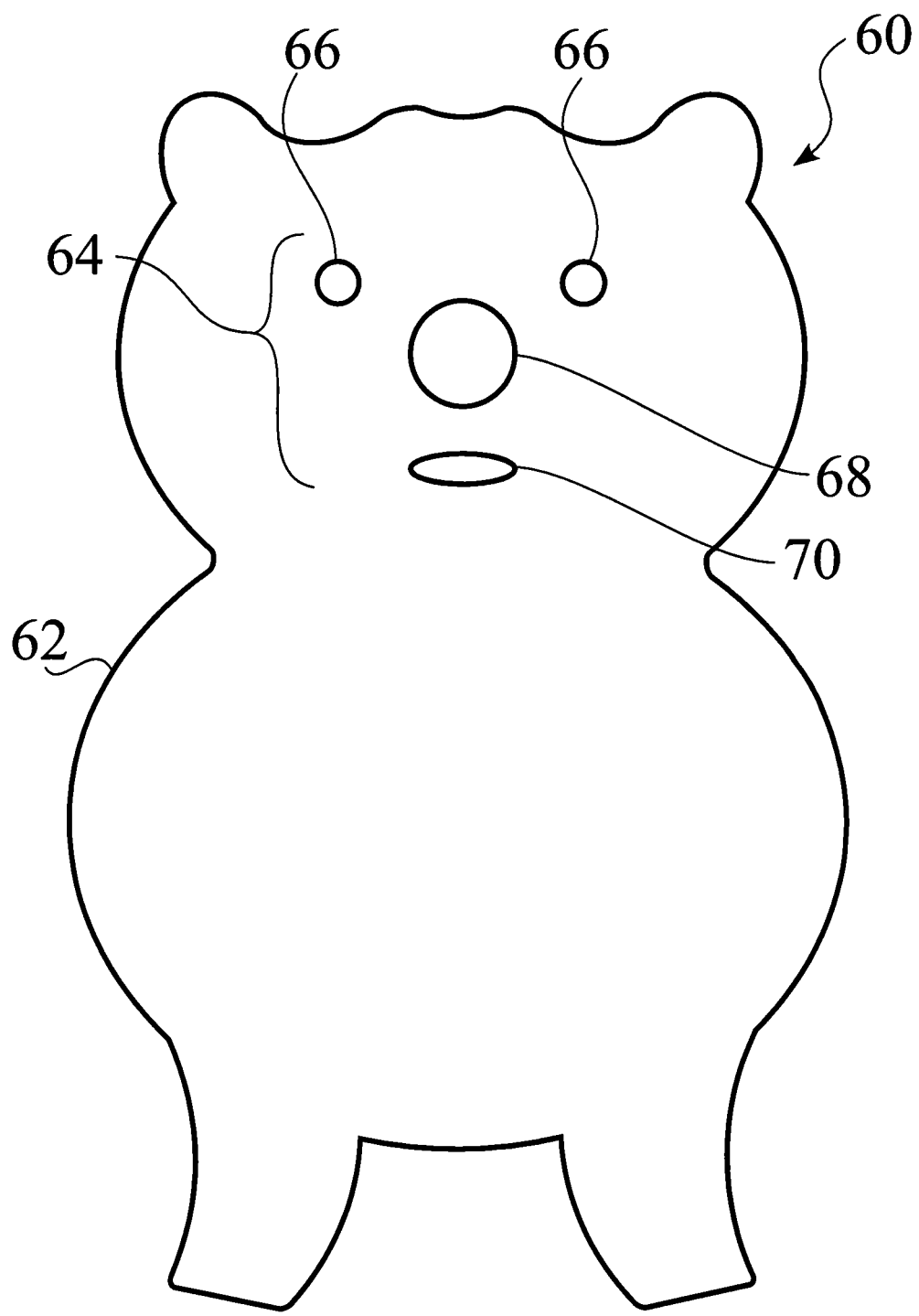
FIG. 2 is a schematic view of an exemplary enhanced stuffed toy corresponding to a system for measuring electrical resistance as a function of length.

FIG. 2 is a schematic view of an exemplary enhanced stuffed toy 60 corresponding to a system 10 for measuring electrical resistance 124 as a function of length 20. The toy 60 may be a plush toy in the shape of an animal, such as the pig shown in FIG. 2 and FIG. 3, and typically comprises an outer cover 62. The toy may also comprise other features 64, such as but limited to any of eyes 66, a nose 68, and/or a mouth 70. Other exemplary features 64 may comprise, for example, legs, arms, a tail and/or wings. Actions 40 controlled by the system 10, such as commanded behaviors 168 (FIG. 8), may be related to the body 62 or to the other features 64, such as but not limited to any of animation, sounds, and/or visual actions or feedback.

Figure 3:
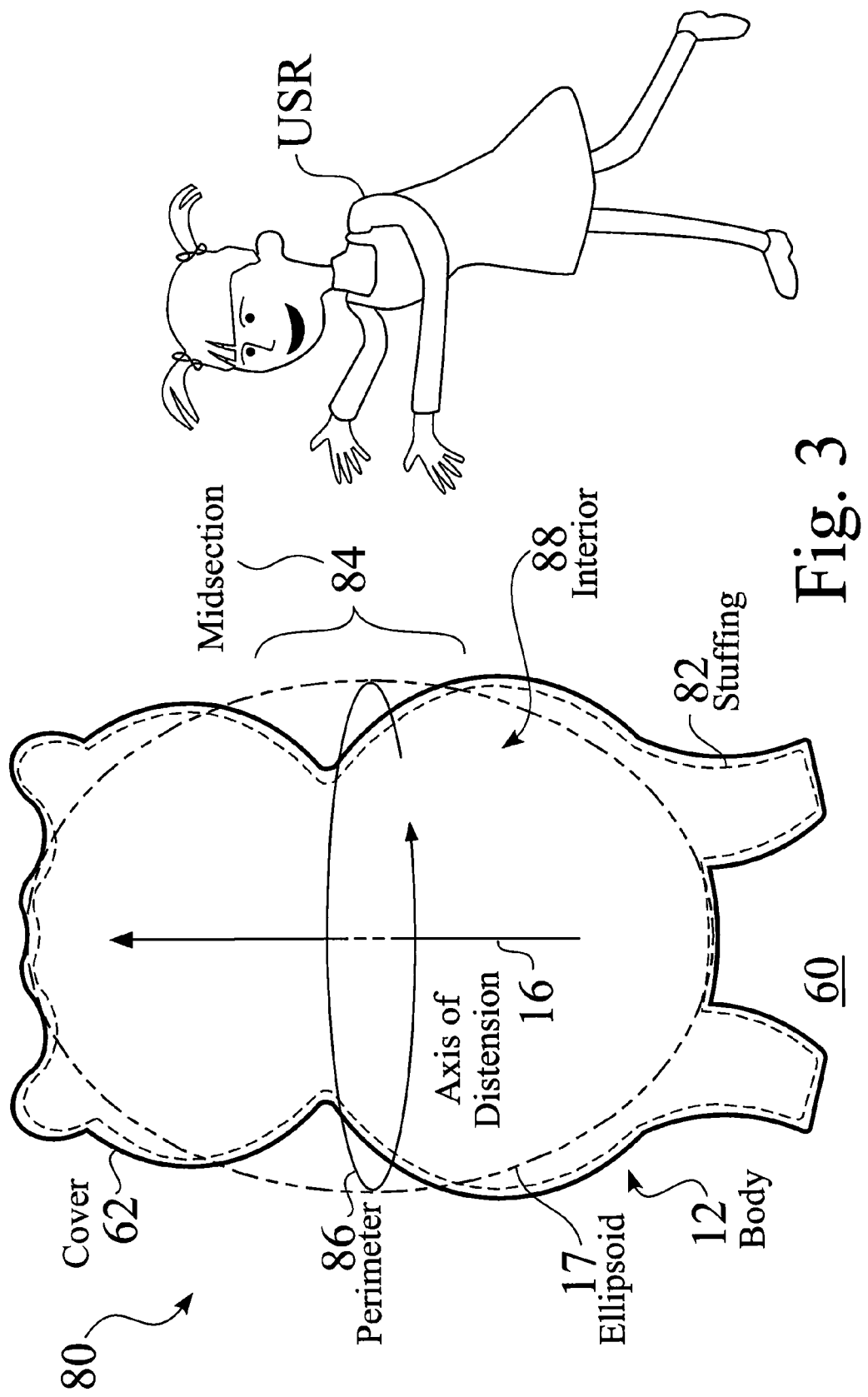
FIG. 3 is a schematic view of an abstract geometry of an exemplary enhanced stuffed toy corresponding to a system for measuring electrical resistance as a function of length.

FIG. 3 is a schematic view 80 of an abstract geometry of an exemplary enhanced stuffed toy 60 corresponding to the system 10. The general shape of the stuffed toy 60 may preferably be represented by a simplified solid body 12 that closely matches the physical extent of the stuffed toy 60. For example, in FIG. 3, the pig of FIG. 2 may be represented by an ellipsoid shape 17. The exemplary toy 60 seen in FIG. 3 comprises stuffing 82 located within an interior region 88 defined within an outer cover 62.

The location of the radial stress 22 applied to the exemplary stuffed toy 60 may be represented by a perimeter of the solid body 12. For example, the location of the radial stress 22 resulting from a user USR hugging the midsection 84 of the pig 60 may be represented by the perimeter 86 shown in FIG. 3. In response to the radial stress 22, the stuffed toy 60, responding in a generally volume-conserving manner, elongates 104 (FIG. 4) along an axis of distension 16, such as generally perpendicular to the plane of the perimeter 86.

Figure 4:
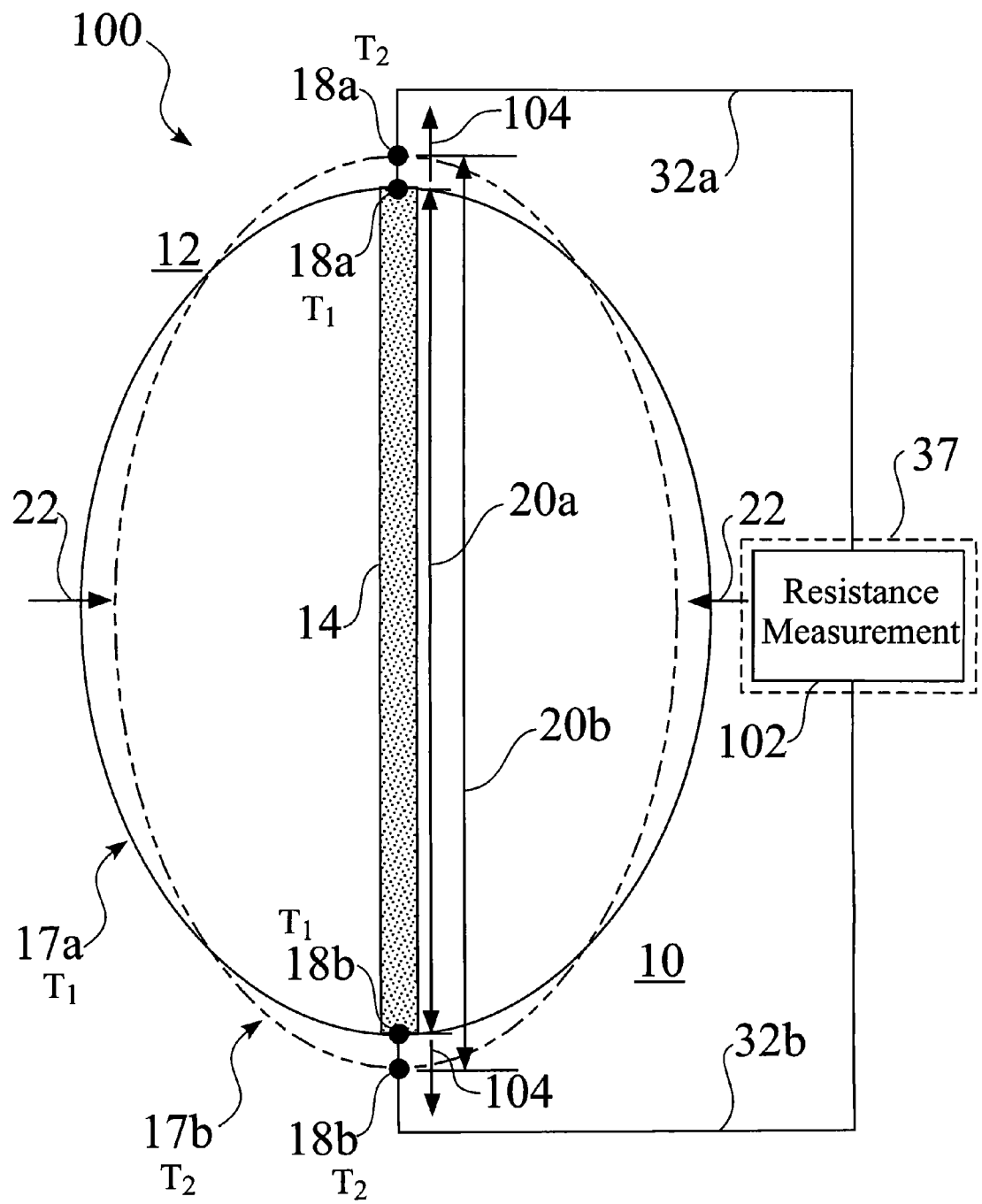
FIG. 4 shows the determination of the strain of a body, based upon the measurement of electrical resistance of a conductive elastomer.

FIG. 4 shows the determination of strain 142 (FIG. 6) applied to a body 12, based upon the measurement of electrical resistance 124 (FIG. 5, FIG. 6) of a conductive elastomer 14. As seen in FIG. 4, a conductive elastomer 14 is attached to the body 12 of the stuffed toy 60 (FIG. 3), at points 18a and 18b along the axis of distension 16 (FIG. 3). The conductive elastomer 14 is electrically connected 30 to the mechanism 37 for measuring 102 the electrical resistance 124, wherein the exemplary mechanism 37 may comprise a microcontroller 34 or a dedicated resistance meter 37. The resistance measuring mechanism 37 may preferably be embedded within the stuffed toy 60. The resistance values 124, such as measured by a resistance meter 37, are then typically provided to the microcontroller 34, which may also be embedded within the stuffed toy 60.

For example, at a first time $T_1$, such as corresponding to the absence of an applied radial stress 22, an exemplary solid body 12 may have a resting ellipsoid shape 17a, associated with a conductive elastomer 14 having a first length 20a and a corresponding first resistance value 128, e.g. 128a (FIG. 5), as measured 102, such as by the microcontroller 34 or by an intermediate measurement mechanism 37. At a second time $T_2$, corresponding to an applied radial stress 22, the exemplary solid body 12, acting in a volume-conserving manner, may generally conform to a second ellipsoid shape 17b, wherein the solid body 12 distends to shape 17b and the conductive elastomer 14 extends 104, such that the conductive elastomer 14 has a second length 20b and a corresponding second resistance value 128, e.g. 128b (FIG. 5), as measured 102. The measured values 128 of electrical resistance 124 may thus be compared by the microcontroller 34, to determine 164 (FIG. 8) current values of interest, such as to determine the strain 142 induced by the applied radial stress 22.

Figure 5:
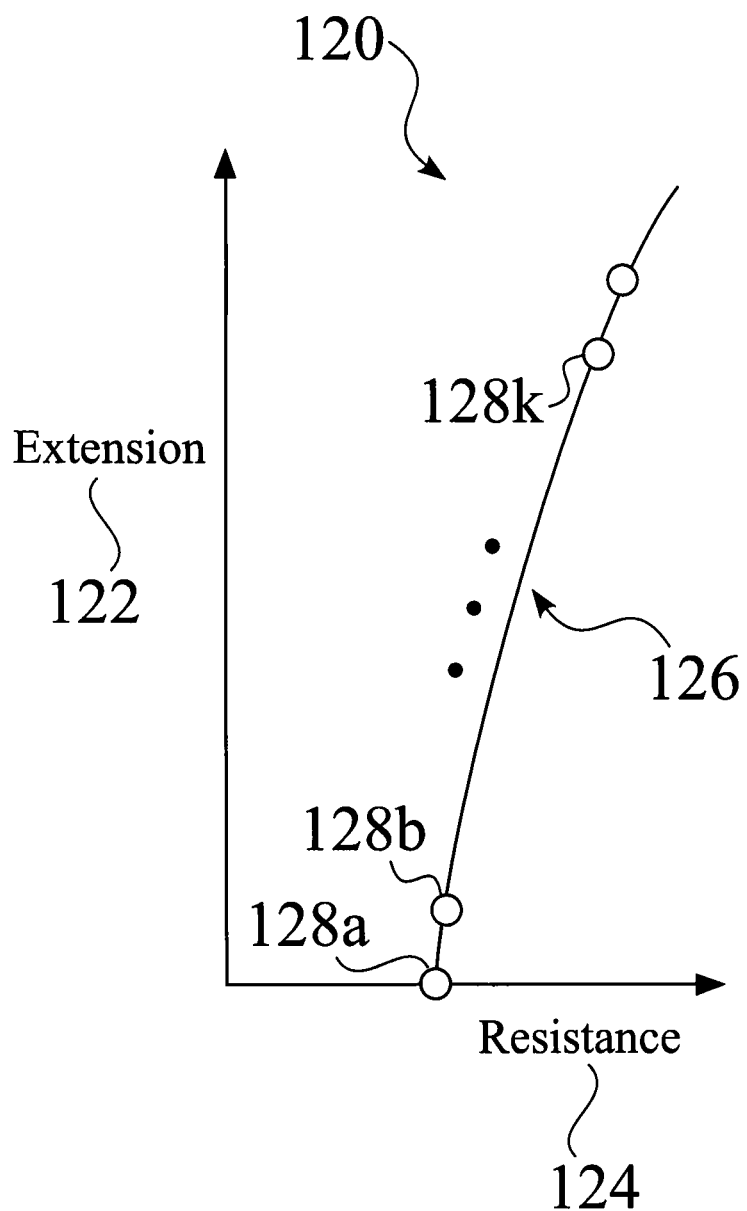
FIG. 5 is an exemplary graph that shows the electrical resistance of a conductive elastomer as a function of extension.

FIG. 5 is an exemplary graph 120 that shows 126 the electrical resistance 124 of a conductive elastomer 14 as a function of extension 122. As seen in FIG. 5, a conductive elastomer 14 has a first resistance value 128*a* for an extension value of zero. As the conductive elastomer 14 is extended, the resistance value 128 changes, e.g. yielding values 128*b*-128*k*. While the exemplary graph 120 seen in FIG. 5 provides one example of a generally non-linear relationship between the electrical resistance 124 of a conductive elastomer 14 and the amount of extension 122, it should be understood that the relationship may be linear, non-linear, or may comprise other functional features, e.g. such as but not limited to any of phases or transitions. As well, while the exemplary graph 120 seen in FIG. 5 shows an electrical resistance 124 that increases for a conductive elastomer 14 as a function of extension 122, alternate conductive elastomers 14 may have an electrical resistance 124 that decreases as a function of extension 122. As well, other system embodiments 10 may comprise a conductive elastomer 14 that is pre-stretched, and is reduced in length 20 due to an applied stress 20, resulting in a change in electrical resistance 124.

FIG. 6 is an exemplary graph 140 that shows 144 induced mechanical strain 142 as a function of the electrical resistance 124 for a conductive elastomer 14 at different points of extension 122. As seen in FIG. 6, a conductive elastomer 14 has a first resistance value 146*a* for a strain value 142 of zero. As the conductive elastomer 14 is extended, the resistance values 146 change, e.g. yielding resistance values 146*b*-146*k*. The mechanical strain 142 is indicative of the relative change in the length 20 of the conductive elastomer 14 due to externally applied forces 22. While the exemplary graph 140 seen in FIG. 6 provides one example of a generally non-linear relationship between the electrical resistance 124 of a conductive elastomer 14 and the amount of induced strain 142, it should be understood that the relationship may be linear, non-linear, or may comprise other functional features, e.g. such as but not limited to any of phases or transitions. As well, while the exemplary graph 140 seen in FIG. 4 shows an electrical resistance 124 that increases for a conductive elastomer 14 as a function of induced strain 142, alternate conductive elastomers 14 may have an electrical resistance 124 that decreases as a function of induced strain 142.

The relationship between the induced strain 142 of the conductive elastomer 14 to the extension 122 (FIG. 5) of the conductive elastomer may be given as:

$$\text{Strain} = (\text{Change in Length of Elastomer})/(\text{Length of Elastomer}) \quad (1)$$

FIG. 7 is an exemplary graph 150 that shows 154 the relationship between determined applied mechanical stress 152 and induced strain 142, wherein the applied mechanical stress 152 is typically directly proportional to the induced strain 142, as consistent with Hooke's law. As seen in FIG. 7, a conductive elastomer 14 has a first stress value 156*a* for a strain value 142 of zero. As the conductive elastomer 14 is extended, the stress values 152 change, e.g. yielding stress values 156*b*-156*k*. The strain 142 and stress 152 are indicative of the externally applied forces 22. A change in resistance 124 corresponds to change in length 20, which implies a strain 142, which in turn corresponds to a determined applied stress 152. Therefore, a calculation of the change in resistance 124 by the microprocessor 34 allows the determination of any of the induced strain 142 or the applied stress 152. The exemplary system 10*a* seen in FIG. 1 may therefore determine the resultant strain 142 along the axis of distension 16 using a conductive elastomer 14.

In some embodiments, the conductive elastomer comprises a non-conductive polymer matrix, and further comprises a conductive filler. For example, in some embodiments of the conductive elastomer 14, the non-conductive matrix of polymer may comprise any of silicone, polyurethane, synthesized rubber (e.g. ethylene propylene diene monomer (EDPM)), or fluorosilicone, or any mixture thereof. Furthermore, in some embodiments of the conductive elastomer 14, the conductive filler, such as a micro-scale filler, may comprise any of silver, graphite, copper, nickel, aluminum, iron, titanium, or molybdenum, or any combination thereof.

In some current exemplary embodiments, the conductive elastomer 14 comprises a length of carbon-impregnated silicon. For example, in some current embodiments, the conductive elastomer 14 comprises SKU No. 20758-01, available through Inventables, Inc., of Chicago, Ill., which comprises a synthetic rubber base material that further comprises a carbon black additive, wherein for a conductive elastomer 14 having a rest length of about 10 cm and an exemplary diameter of 2 mm, there is a resistance change of approximately 400 Ohms/cm for each centimeter of extension 104.

In some alternate embodiments, the conductive elastomer 14 comprises a flexible stretch sensor, e.g. Part No. STRX-12, available through Images SI Inc., of Staten Island, N.Y., which comprises a flexible cylindrical cord, having a diameter of about 0.060" to 0.070", with electrical terminals at each end 18*a*,18*b*.

The conductive elastomer 14 is therefore characterized by an electrical resistance 124 that varies as its length 20 changes. The variation in electrical resistance 124 may preferably be monotonic, such that a particular electrical resistance 124 uniquely corresponds to a single length 20 of the conductive elastomer 14. For example, carbon-impregnated silicon exhibits a monotonically increasing resistance with increasing length 20.

By affixing the conductive elastomer to the stuffed toy 60 along the axis of distension 16, the microprocessor 34 can determine any of the change in length 20, the induced strain 142, or the applied stress 152 of the stuffed toy 60 along the axis of distension 16, by measuring the electrical resistance 124 of the conductive elastomer 14.

The conductive elastomer shown in FIG. 1 and FIG. 4 may preferably span the entire length of the ellipsoid 17 that generally corresponds to the physical extents of the stuffed toy 60. However, in other embodiments, the conductive elastomer 14 may span only a portion of the solid body 12 along the axis of distension 16, or may extend beyond the edges of the solid body 12.

In response to the application of a radial stress 22, the characteristic length 20 of the stuffed toy 60 increases 104 along the axis of distension 16. This increases 104 the length 20 of the conductive elastomer 14, shifting the points of attachment 18*a* and 18*b*, as the shape of the ellipsoid 17, e.g. 17*a*, changes to the shape of ellipsoid 17*b*. The microcontroller 34 monitors the electrical resistance 124 of the conductive elastomer 14, such as measured by the resistance meter 37, and from the resistance 124, can determine the amount of strain 142 experienced by the stuffed toy 60 along the axis of distension 16.

The microcontroller 34 may then use the strain 142 to determine the magnitude of the radial stress 152 applied to the stuffed toy 60. For a stuffed toy geometry comprising a relatively simple corresponding solid body 12, it may be practical to analytically determine the precise relationship between the strain 142 and the applied radial stress 152. In such cases, the mathematical relationship between the strain 142 and the radial stress 22 may preferably encoded within the microcontroller 34, or stored within a memory 38.

For other stuffed toy geometries 12, it may be more practical to characterize the strain 142 of the conductive elastomer 14 in response to a radial stress 22 during a calibration procedure. In these cases, the results of the calibration procedure can be stored, e.g. within a table 42 (FIG. 1) that relates determined strain values 142 to stress values 22 or 152, in a memory 38, either within or accessible to the microcontroller 34. As with the relationship between the resistance 124 of the conductive elastomer 14 and the strain 142 experienced by the stuffed toy 60, the relationship between the strain 142 and determined radial stress 152 need not be linear, and indeed may be very complex. However, the relationship may preferably be monotonic, such that a particular strain value 142 uniquely corresponds to a single determined radial stress 152.

In response to the determined radial stress 152, the microcontroller 34 can invoke a particular response 40 from the toy 60. The microcontroller 40 can command behaviors 168 (FIG. 8) based on the current value of the determined radial stress 152, prior values of the determined radial stress 152, the current rate of change of the determined radial stress 152, or prior rates of change of the radial stress 152.

In some system embodiments 10, it may not be necessary to actually calculate a numeric value for the determined radial stress 152. Given a one-to-one relationship between a determined strain 142 and a determined radial stress 152, it may be sufficient in some applications to base the microcontroller actions 40 on strain values 142 that correspond to particular determined radial stresses 152 of interest.

Similarly, it may not be necessary to actually determine a numeric value for the strain 142. Given a one-to-one relationship between a measured resistance 124 and strain 142, it may be sufficient in some applications, e.g. such as for interactive, talking stuffed toys 60, to base the microcontroller actions 40 on resistance values 124 that correspond to particular determined radial stresses 152 of interest. Strain values 142 or determined radial stress values 152 may preferably be computed in some system applications 10, e.g. such as for but not limited to devices 60 that provide a numeric readout 40 of the strain 142 or determined radial stress 152, wherein the numeric value of the determined strain 142 or radial stress 152 is itself of interest.

Figure 8:
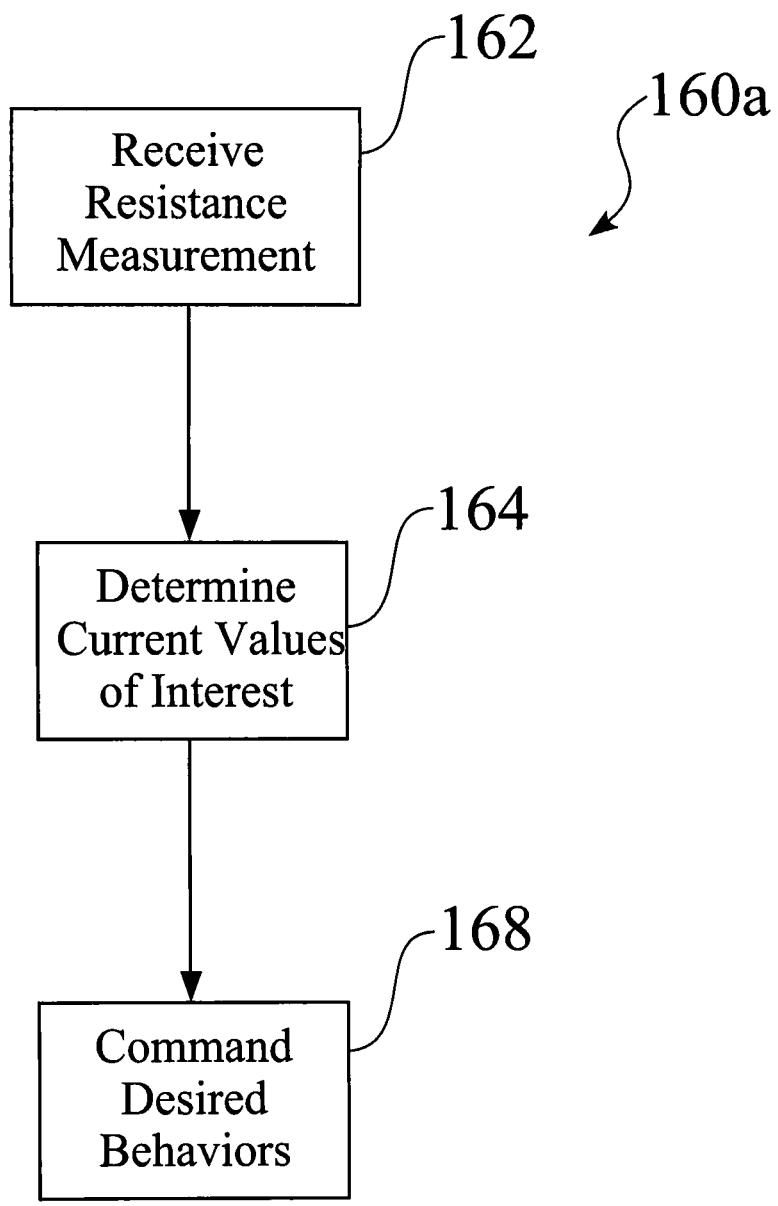
FIG. 8 is a flow chart of an exemplary process associated with a system for measuring electrical resistance as a function of length of a structure, and for controllably taking one or more actions in response to the measured resistance.

FIG. 8 is a flow chart of an exemplary process 160, e.g. 160a, associated with a system 10 for measuring 102 electrical resistance 124 as a function of length 20 of a structure 14, and for controllably taking one or more actions 40 in response to the measured 102 resistance 124. The process 160 summarized in FIG. 8 may be executed by the microcontroller 34, either on a continual basis, e.g. as part of a looping procedure, or when called by another process that is executed by the microcontroller 34. The process 160 begins when the microcontroller 34 receives 162 a resistance measurement 102. Optionally, the microcontroller 34 may determine 164 other current values of interest based on the resistance measurement 102. Finally, the microcontroller 34 commands 168 one or more desired behaviors 40, e.g. 40a-40k (FIG. 1), based on the resistance measurement 102 and any other current values of interest determined.

In some system embodiments 10, the microcontroller 34 may preferably trigger the production of interactive dialogue in response to particular resistance measurements. For example, the pig 60 of FIG. 3 may oink when the microcontroller 60 receives a resistance measurement 102 less than a predetermined threshold 39 (FIG. 1), and squeal when the microcontroller 34 receives a resistance measurement greater than the predetermined threshold 39.

Figure 9:
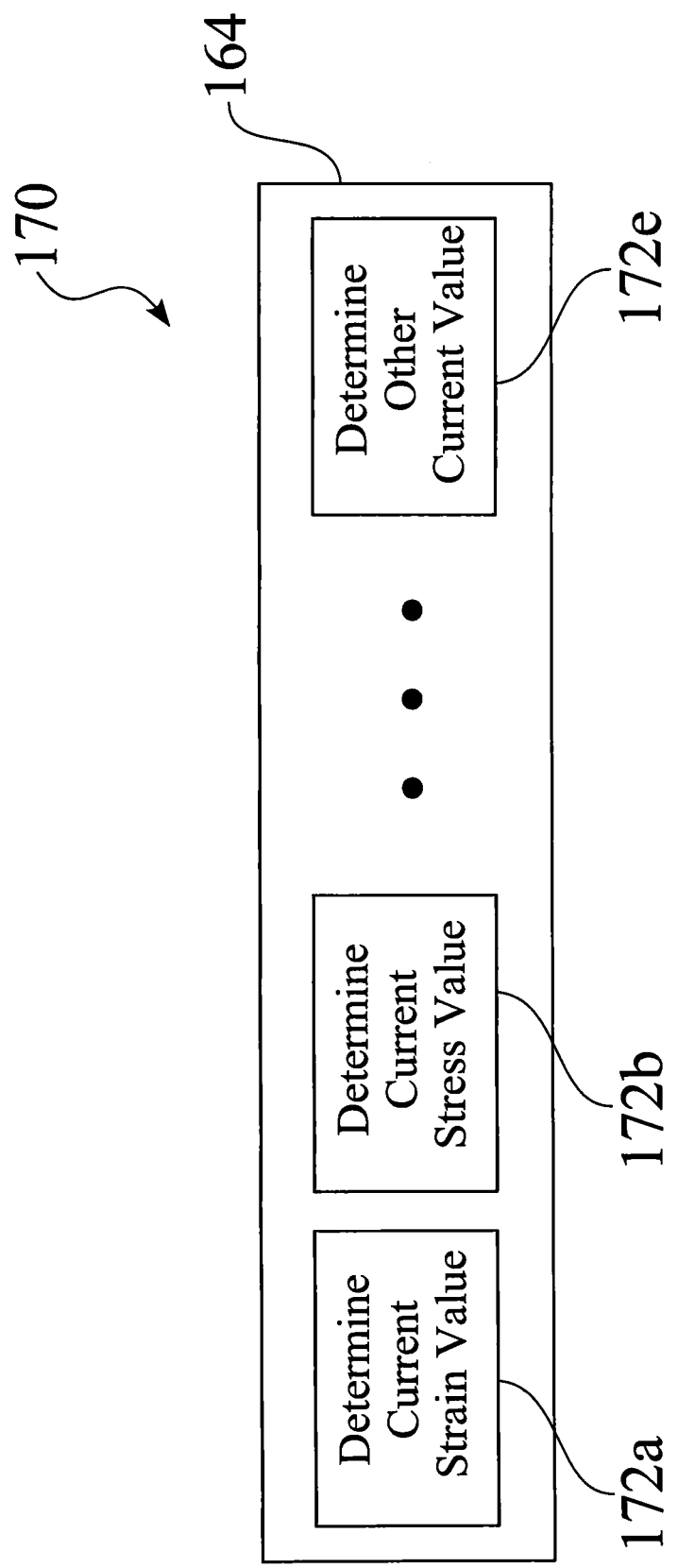
FIG. 9 is a schematic view of exemplary values of interest that may be calculated with a system for measuring electrical resistance as a function of length of a structure.

FIG. 9 is a schematic view 170 of exemplary determined values of interest 172, e.g. 172a-172e, that may be calculated with a system 10 for measuring electrical resistance as a function of length 20 of a structure 14. For example, the microcontroller 34 may determine any of the strain 142 or the radial stress 152 corresponding to the resistance measurements 102. The microcontroller 34 may thus command desired behaviors 40, based on any of the resistance measurement 102 and the corresponding determined strain 142 and radial stress 152. For example, the pig 60 of FIG. 1 may oink when squeezed with a radial stress 22 less than a predetermined threshold 39, and squeal when squeezed with a radial stress 22 greater than the predetermined threshold 39.

Figure 10:
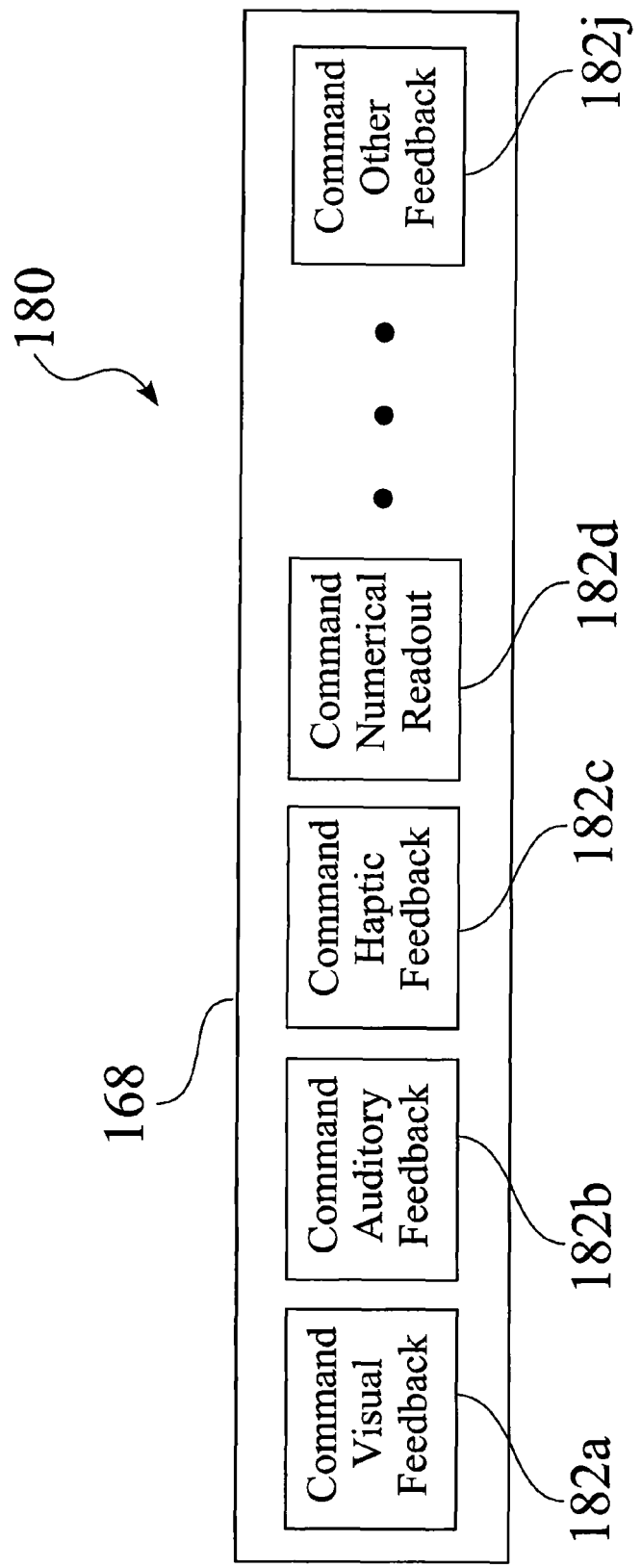
FIG. 10 is a schematic view of exemplary behaviors that may be commanded with a system for measuring electrical resistance as a function of length of a structure.

FIG. 10 is a schematic view 180 of exemplary feedback 182, e.g. 182a-182j, that may be commanded 168 with a system 10 for measuring 102 electrical resistance 124 as a function of length 20 of a structure 14, e.g. a conductive elastomer 14. As seen in FIG. 10, the microcontroller 34 may command 168 any of visual feedback 182a, auditory feedback 182b, haptic feedback 182c, numerical readout 182d, or other feedback 182j based on one or more of the resistance measurements 102 and/or the values of interest 172.

Figure 11:
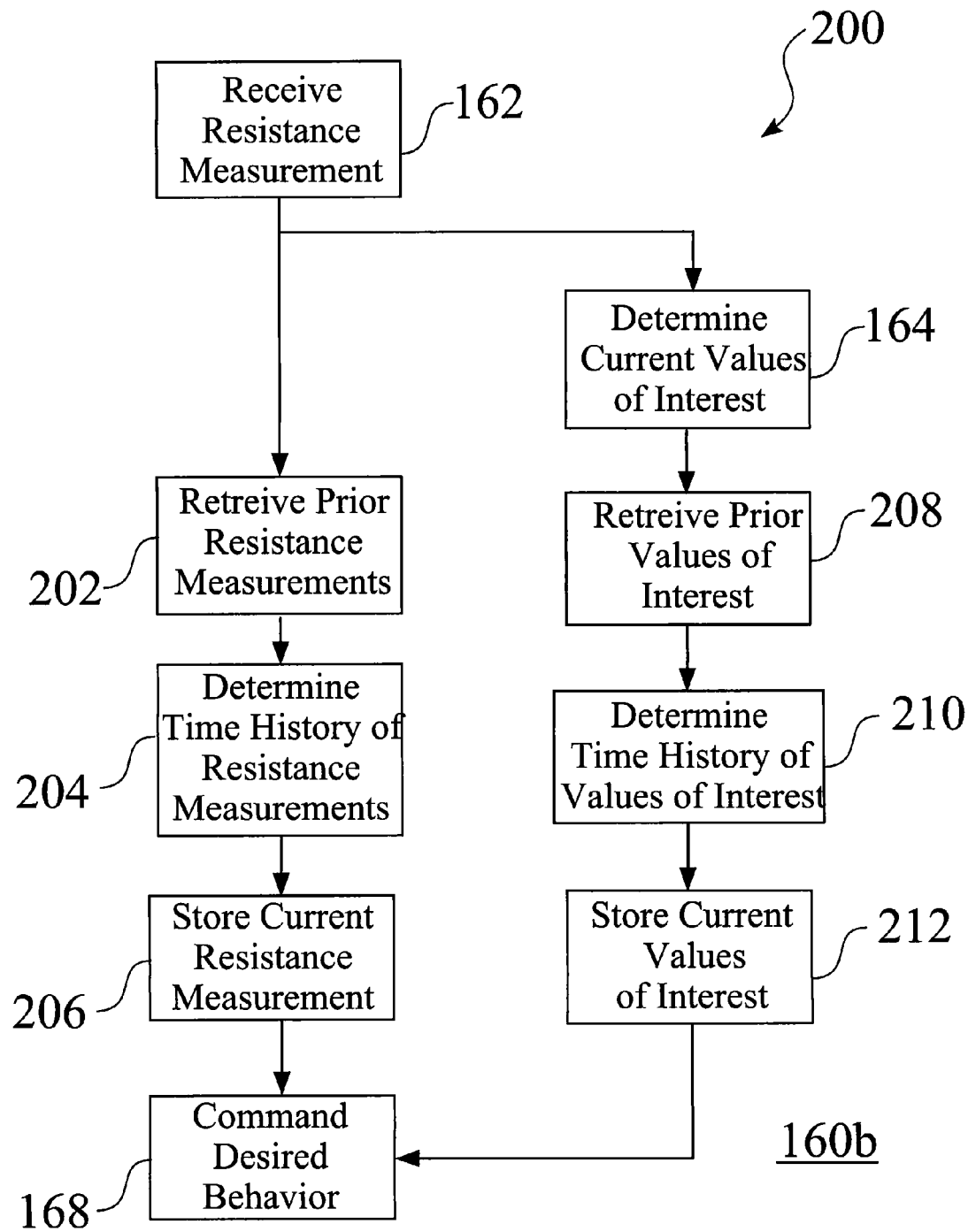
FIG. 11 is a flow chart of an exemplary process for determining a time history of resistance measurements and values of interest associated with a system for measuring electrical resistance as a function of length of a structure, and for controllably taking one or more actions in response to the measured resistance.

FIG. 11 is a flow chart 200 of an exemplary process 160b for determining a time history of resistance measurements 124 and determined values of interest 162 associated with a system 10 for measuring electrical resistance 124 as a function of length 20 of a structure 14, and for controllably taking one or more actions 40 in response to the measured resistance 124, and/or the time history of the measures resistance.

For example, in addition to receiving 162 the current resistance measurement 102, the microcontroller 34 may retrieve 202 prior resistance measurements 102 from a memory 38, e.g. onboard or associated with the microcontroller 34, and may store 206 the current resistance measurement 102 in the memory 38. In addition to determining 164 the current values of interest 172, the microcontroller 34 may additionally retrieve 208 prior values of interest 172 from the memory 38, and may store 212 the current values of interest 172 in the memory 38. Based on the prior resistance measurements 102 and the current resistance measurement 102, the microcontroller 34 determines 204 a time history of the resistance measurements 102. Similarly, based on the prior values of interest 172 and the current values of interest 172, the microcontroller 34 determines 210 a time history of the values of interest 172. The time history of the resistance measurements 102 or other values of interest 172 may preferably comprise current rates of change and prior rates of change, and may also include resistance measurements 102 or values of interest 172 integrated over a recent period of time.

Figure 12:
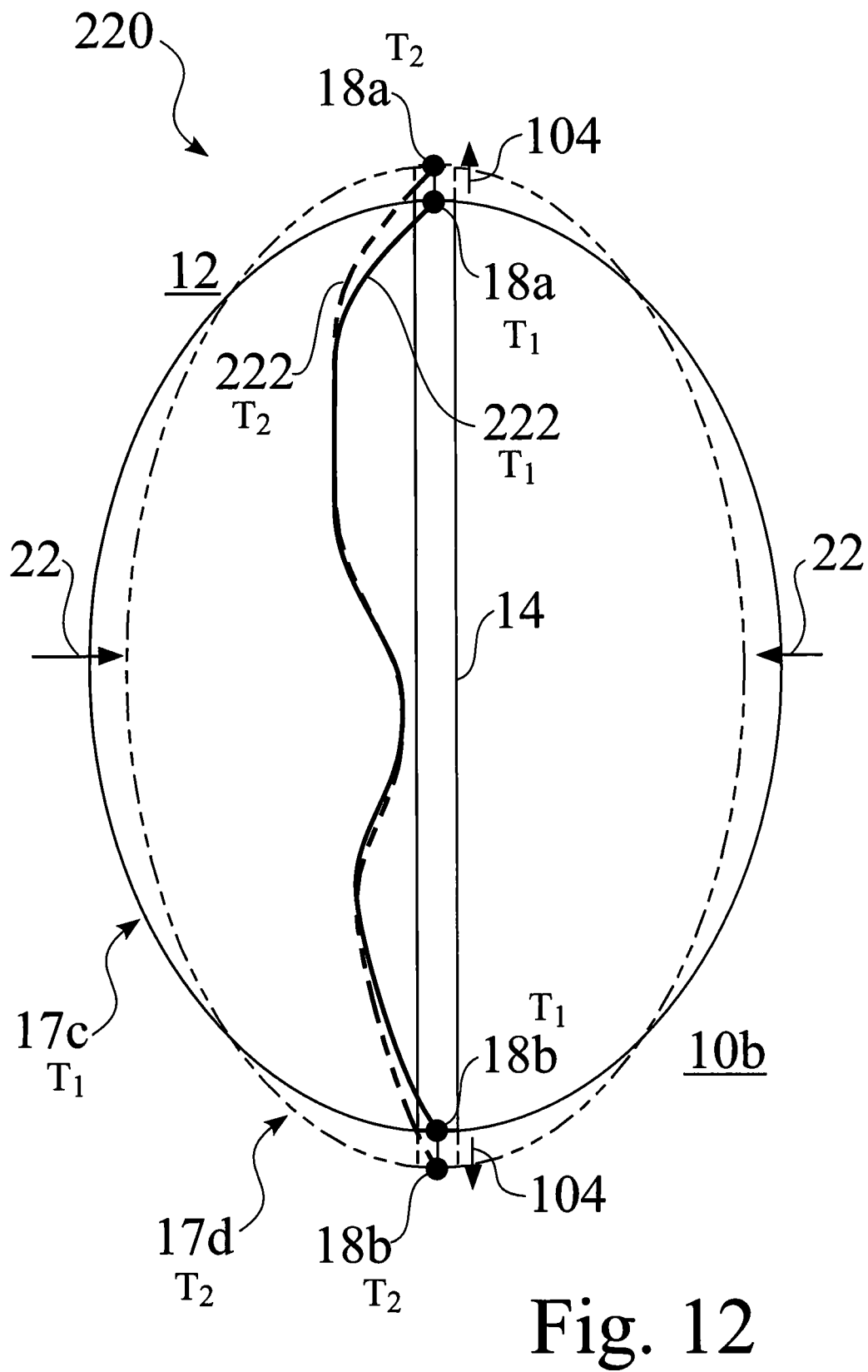
FIG. 12 is a schematic diagram of a system for measuring electrical resistance as a function of length of a structure, which further comprises a shunt for limiting the stress applied to or the strain induced in a conductive elastomer.

FIG. 12 is a partial schematic diagram 220 of an exemplary system 10b for measuring electrical resistance 124 as a function of length of a structure 14, which further comprises a shunt 222 for limiting the strain 142 induced in a conductive elastomer 14. The shunt 222 may preferably be formed from a relatively stiff material, and is attached to the body 12, e.g. such as of a stuffed toy 60, in parallel to the conductive elastomer 14, at points 18a and 18b. The exemplary system 10b seen in FIG. 12 shows the configuration at a first time $T_1$, wherein the body 12 at rest has a first shape 17c, and at a second time $T_2$, wherein the body is acted upon by a radial stress 22, thereby extending 104 the body 12 to create a second shape 17d, and extending both the conductive elastomer 14 and the shunt 222.

The shunt 222 prevents damage to the conductive elastomer 14, should a user USR apply a radial stress 22 of a magnitude that would, in the absence of the shunt 222, distend the stuffed toy 60 to an extent that would strain the conductive elastomer 14 beyond its elastic limit. If the user USR applies such a radial stress 22, the initially slack shunt 22 is extended into a taught configuration from which it resists further distension of the stuffed toy 60 along the axis of distension. If the user USR squeezes still harder, the toy 60 may typically respond by finding relief along other axes of distension.

Figure 13:
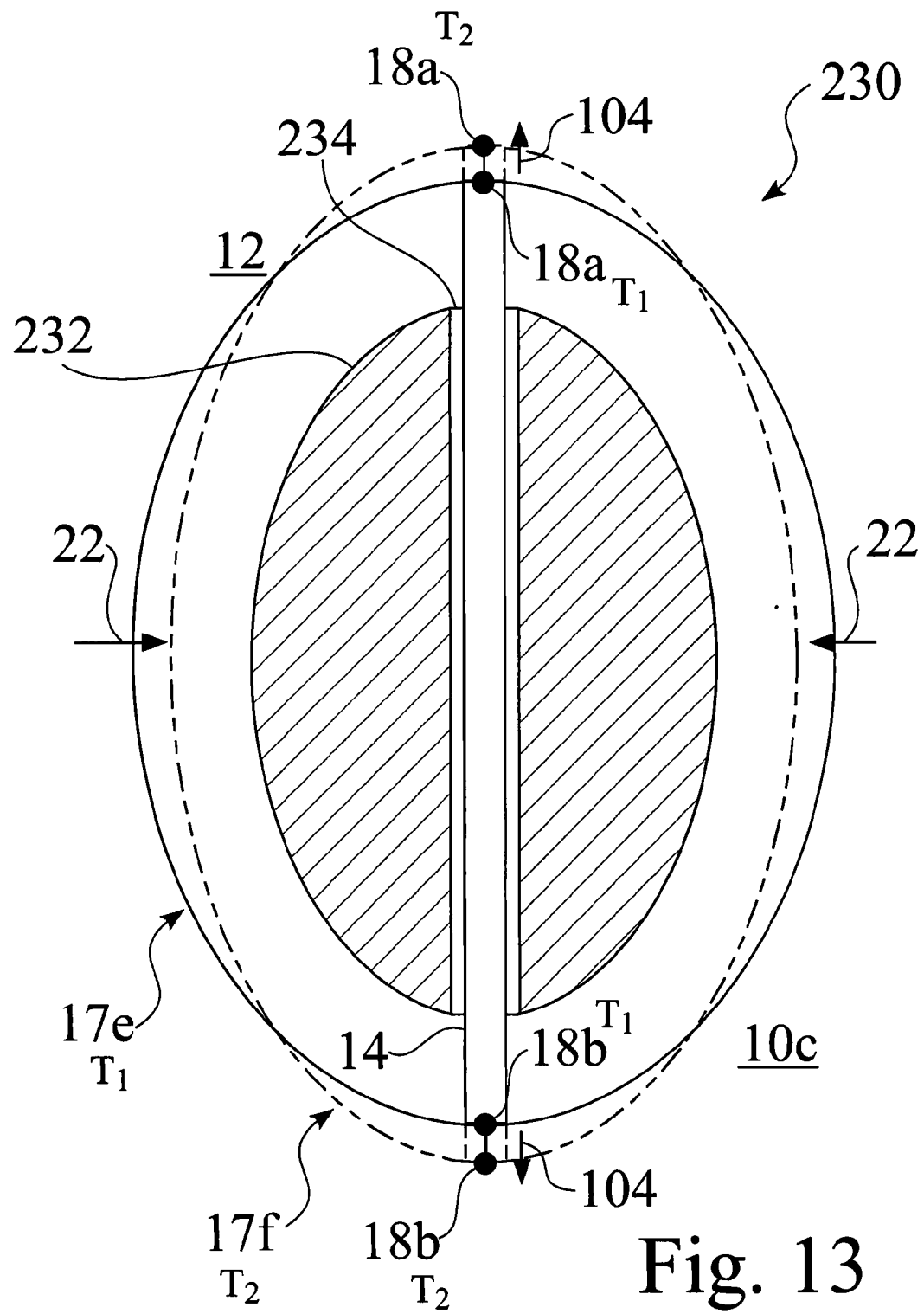
FIG. 13 is a schematic diagram of a system for measuring electrical resistance as a function of length of a structure, which further comprises an inner core for limiting the stress applied to or the strain induced in a conductive elastomer.

FIG. 13 is a schematic diagram 230 of an exemplary system 10c for measuring electrical resistance 124 as a function of length of a structure 14, which further comprises an inner core 232 for limiting the strain 142 applied to an conductive elastomer 14. The inner core 232 may preferably comprise a shape similar to the solid body 12 that may closely conform to or otherwise match the physical extents of a stuffed toy 60. The inner core 232 may preferably be inserted within the interior 88 of the stuffed toy 60, such that it is generally concentric with the solid body 12. Depending on the relative position and orientation of the inner core 232 and conductive elastomer 14, the inner core 232 may comprise a passageway 234 defined therethrough, to allow the conductive elastomer 14 to pass through the inner core 232 in an unobstructed manner. The inner core 232 limits the inward compression of the stuffed toy 60 along the perimeter of the body 12, and therefore limits the distension 104 along the axis of distension 16, and the strain 142 experienced by the conductive elastomer 14. The exemplary system 10c seen in FIG. 13 shows the configuration at a first time $T_1$, wherein the body 12 at rest has a first shape 17e, and at a second time $T_2$, wherein the body is acted upon by a radial stress 22, thereby extending 104 the body 12 to create a second shape 17f, and extending the conductive elastomer 14.

Figure 14:
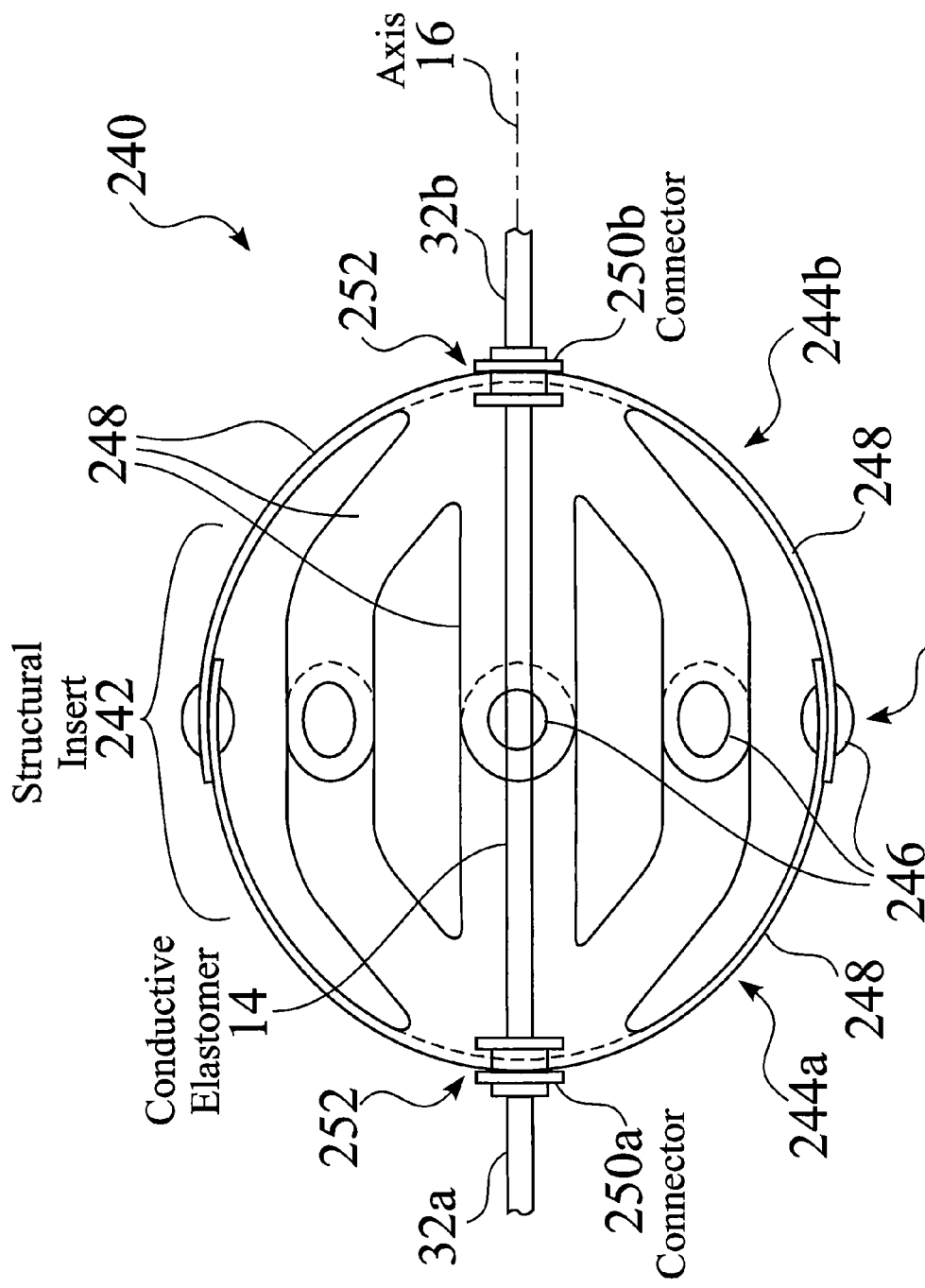
FIG. 14 is a partial schematic view of an exemplary structural insert for measuring electrical resistance or strain as a function of length of a structure, such as for a stuffed toy.

FIG. 14 is a partial schematic view 240 of an exemplary structural insert 242 for measuring electrical resistance 124 or strain 142 as a function of length 20 of a structure 14, such as for a stuffed toy 60. The structural insert 242 may be inserted into the interior 88 of a stuffed toy 60 during construction of the stuffed toy 60. In response to an applied radial stress 22, the structural insert 242 increases in length along an axis 16 generally perpendicular to the plane of the radial stress 22. The structural insert 242 thus allows the process 160, e.g. 160a (FIG. 8) or 160b (FIG. 11), to be applied to stuffed toys 60 that would not ordinarily exhibit the volume conserving behavior illustrated in FIG. 4. In such applications, the structural insert generally corresponds to the solid body 12 of FIG. 1 and FIG. 4.

As shown in FIG. 14, the structural insert 242 may be generally spherical or ellipsoidal in shape, and may comprise a number of longitudinal members 248 that converge at the poles 252 of the sphere. A conductive elastomer 14 is held in place by connectors 250a and 250b that may also serve to couple the longitudinal arms 248 to one another. As also seen in FIG. 14, the structural insert 242 may comprise opposing members 244a,244b that are joined 246, such as within a central region 254.

The structural insert 242 may alternately be formed from a single piece of cast thermoplastic, e.g. such as in the shape of a hollow sphere or ellipsoid, with longitudinally oriented, oblong perforations. Alternatively, the structural insert 242 may comprise a solid piece of elastic material, generally spherical or ellipsoidal in shape, formed using a dual-stage casting in which stiffer material is deposited near the poles of the body, i.e. where the axis of distension 16 exits the structural insert 242. Another alternate embodiment of the structural insert 242 may preferably be formed in a manner similar to "air muscles", in which a latex or silicone bladder is surrounded by a mesh sleeving, the axis of which defines the axis of distension 16.

Figure 15:
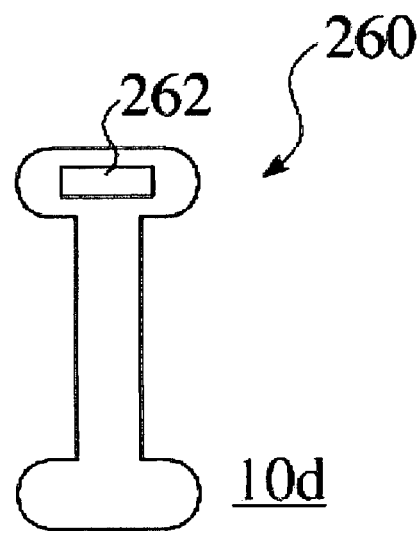
FIG. 15 is a schematic diagram of an enhanced therapeutic device having an associated strain measurement device.

While the some of the exemplary embodiments of the system 10 and process 160 are described in reference to a stuffed toy 60, the system 10 and process 160 may also find application in exercise toys, for example, toys to be squeezed during physical therapy rehabilitating an injured hand, wrist, or forearm. FIG. 15 is a schematic view of 260 of an exercise device 10d that is programmed to measure electrical resistance 124 or strain 142 as a function of length 20 of a structure 14, e.g. a conductive elastomer. The microcontroller 34 can provide feedback 262 to the patient USR, e.g. via numeric values, auditory tones, or lights of varying color or intensity, such as through but not limited to a speaker, one or more LEDs, and/or a display panel, based on the measured resistance and/or the determined values of the radial stress 22.

Figure 16:
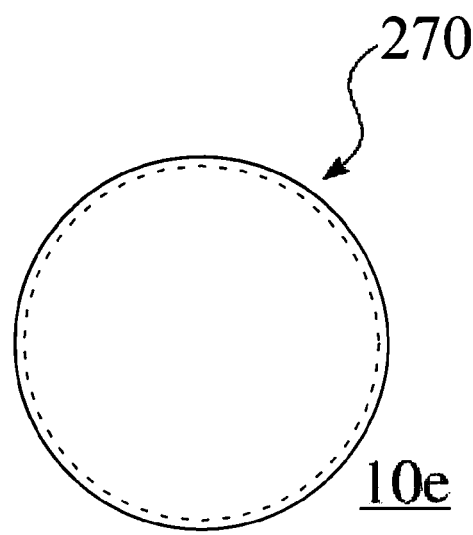
FIG. 16 is a schematic diagram of an alternate toy structure having an associated strain measurement device.

FIG. 16 is a schematic diagram of an alternate toy structure 270 having an associated strain measurement system 10e. The system 10 and associated process may readily be applied to toys 270 of various constructions, e.g. such as but not limited to thin-walled, fluid filled toys, e.g. liquid filled membranes, and/or thick-walled, hollow toys, e.g. hollow rubber balls.

FIG. 17 is a schematic diagram of an enhanced scale 280 having an associated strain measurement system 10f. As seen in FIG. 17, the system 10 and associated process 160 may readily be applied to measurement devices, such as but not limited to bathroom scales or kitchen scales 280. For example, the characteristics, readout display, or other feedback from the device 280 may change, based on an applied weight on the scale.

FIG. 18 is a schematic diagram of an enhanced cushion having an associated strain measurement system 10g. As seen in FIG. 18, the system 10 and associated process 160 may readily be applied to any of mattresses, couches, seats or cushions, such as to change characteristics according to the weight of one or more users. For example, an enhanced automotive seat 290 may preferably be controlled to disable an airbag when a child is seated in the seat 290.

While some exemplary embodiments of the structures, systems, and processes disclosed herein are implemented with respect to a variety of toys, exercise devices, scales, and cushions, the structures, systems, and processes may also be used for other devices, such as but not limited to musical instruments or exercise devices that provide feedback to users in response to the intensity of the stress applied to specific locations on the instrument or device.

As well, the structures, systems, and processes disclosed herein may readily be applied to toys or other devices with multiple conductive elastomers aligned along multiple axes of distension 16. Such a configuration allows the microcontroller 34 to characterize strains 142 and radial stresses 22 along and about more than one spatial axis. Measurements along more than one spatial axis can allow, for example, more sophisticated interactive behavior from a stuffed toy or more detailed feedback on patient performance from a physical therapy toy.

Figure 19:
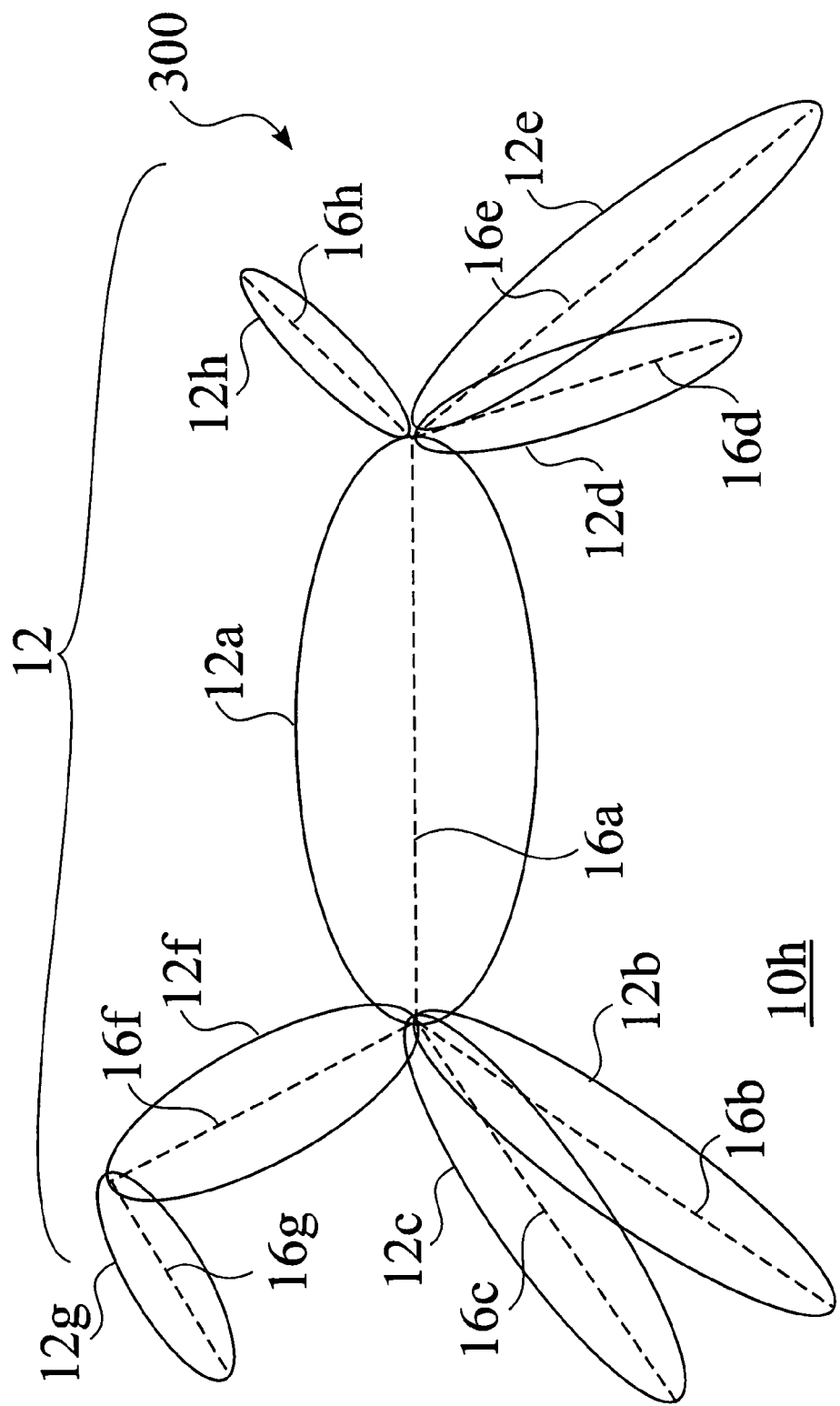
FIG. 19 is a schematic diagram of a device having a plurality of conductive elastomers associated with different sections of a body.

FIG. 19 is a schematic diagram 300 of a device 10h having a plurality of conductive elastomers associated with different sections of a body 12. The exemplary body 12 seen in FIG. 19 comprises a plurality of interconnected body sections, such as a torso 12a, legs 12b-12e, a neck 12f, a head 12g, and a tail 12h. As well, each of the body sections has a corresponding axis of distension 16, e.g. 16a-16h. The microcontroller 34 may preferably characterize strains 142 and radial stresses 22 along and about more than one spatial axis 16, and may preferably sophisticated interactive behavior, such as to provide detailed feedback, based on where the user USR hugs the structure 10h, and/or how much pressure is applied to one or more regions of the structure 10h. In some embodiments 10h, pressure applied to one section, e.g. 12a, of the structure 10g may alter the length 20 of a conductive elastomer 12 in another section, e.g. 12f, of the structure 10g.

Figure 20:
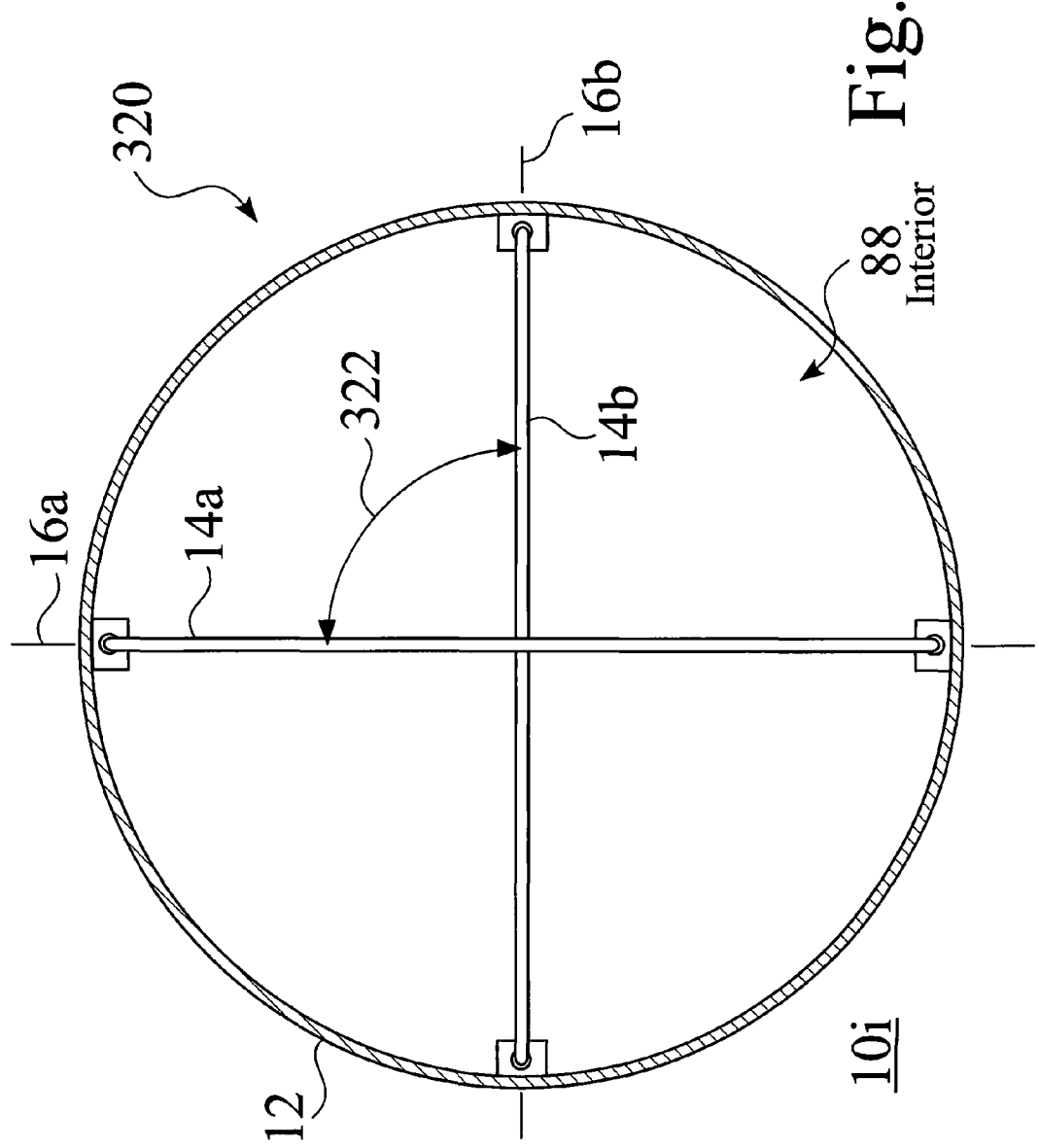
FIG. 20 is a schematic diagram of an apparatus having plurality of conductive elastomers associated with a body.

FIG. 20 is a schematic diagram 320 of an apparatus 10i having plurality of conductive elastomers within a defined interior region 88 of a body 12. As seen in FIG. 20, a first conductive elastomer 14a is generally aligned along a first axis of distension 16a, while a second conductive elastomer 14b is generally aligned along a second axis of distension 16b, wherein the first axis of distension 16a and the second axis of distension 16b cross with respect to each other, e.g. such as having a corresponding angle 322 defined between the first axis 16a and the second axis 16b. In the exemplary structure 10i seen in FIG. 10, the first axis 16a and the second axis 16b may preferably be substantially perpendicular with each other.

In the structure 10i seen in FIG. 20, an applied radial stress 22 about the body 12 may change the length 20 of one or both of the conductive elastomers 14. For example, a radial stress 22 that is generally aligned with a first axis of distension 16a may contract the length 20 of the first conductive elastomer 14a, while increasing the length of the second conductive elastomer 14b. Therefore, an associated microcontroller 34 may preferably characterize strains 142 and radial stresses 22 along and about more than one spatial axis 16, and may preferably sophisticated interactive behavior, such as to provide detailed feedback, based on where the user USR hugs the structure 10i, and how different portions of the structure 12 react to the applied pressure.

Accordingly, although the invention has been described in detail with reference to a particular preferred embodiment, persons possessing ordinary skill in the art to which this invention pertains will appreciate that various modifications and enhancements may be made without departing from the spirit and scope of the claims that follow.

The invention claimed is:

1. An apparatus, comprising:
a structural body having a defined axis that extends between a first point and a second point, wherein the distance between the first point and the second point changes in reaction to a radial stress applied along a plane;
a conductive elastomer that is distinct from said structural body, wherein said conductive elastomer is positioned relative to said structural body to span an interior thereof, wherein said conductive elastomer is affixed in a stretched state along the defined axis between the first point and the second point, wherein the conductive elastomer has an electrical resistance that varies as a function of distance between the first point and the second point,
where the conductive elastomer becomes further tensioned and the length of the conductive elastomer increases when the plane is perpendicular relative to the defined axis, and
where the conductive elastomer becomes relaxed when the plane is parallel relative to the defined axis;
a mechanism for measuring the electrical resistance of the conductive elastomer; and
a mechanism for taking at least one action in response to a change in the measured electrical resistance based on the radial stress.

2. The apparatus of claim 1, wherein the at least one action comprises a desired behavior.

3. The apparatus of claim 1, wherein the at least one action comprises any of a visual feedback, an auditory feedback, a haptic feedback, or a numerical readout.

4. The apparatus of claim 1, further comprising:
at least one processor;
wherein the at least one processor is programmed to determine at least one current value of interest that is based upon the measured electrical resistance.

5. The apparatus of claim 4, wherein the at least one current value of interest comprises any of a strain value or a stress value.

6. The apparatus of claim 1, wherein the conductive elastomer comprises carbon-impregnated silicon.

7. The apparatus of claim 1, further comprising:
at least one processor;
wherein the at least one processor is programmed to compare values for measured electrical resistance taken at least at two different times; and
wherein the at least one action is based on the comparison.

8. The apparatus of claim 1, further comprising:
at least one predetermined threshold;
wherein the at least one action is based upon a comparison between the change in the measured electrical resistance and the predetermined threshold.

9. The apparatus of claim 1, wherein the apparatus comprises any of a toy, an exercise device, a scale, a cushion, a mattress, or a seat.

10. The apparatus of claim 1, further comprising:
a processor; and
a memory;
wherein the processor is programmed to store the measured electrical resistance value within the memory.

11. The apparatus of claim 1, wherein the at least one action is at least partially based on any of:
a history of the measured electrical resistance,
a history of at least one current value of interest that is based upon the measured electrical resistance,
a rate of change of the measured electrical resistance,
a rate of change of at least one current value of interest that is based upon the measured electrical resistance,
an integration of measured electrical resistance values over a period of time, or
an integration of at least one current value of interest that is based upon the measured electrical resistance over a period of time.

12. A process, comprising the steps of:
providing a structure comprising a structural body having a defined axis that extends between a first point and a second point, and
a conductive elastomer that is distinct from said structural body, wherein said conductive elastomer is positioned relative to said structural body to span an interior thereof, wherein said conductive elastomer is affixed in a stretched state along the defined axis between the first point and the second point, wherein the conductive elastomer has an electrical resistance that varies as a function of distance between the first point and the second point;
measuring the electrical resistance of the conductive elastomer when the structural body is acted upon by a radial stress applied along a plane,
where the conductive elastomer becomes further tensioned and the length of the conductive elastomer increases when the plane is perpendicular relative to the defined axis, and where the conductive elastomer becomes relaxed when the plane is substantially parallel relative to the defined axis; and providing at least one action in response to the measured electrical resistance.

13. The process of claim 12, wherein the at least one action comprises a desired behavior.

14. The process of claim 12, wherein the at least one action comprises any of visual feedback, auditory feedback, haptic feedback, or a numerical readout.

15. The process of claim 12, further comprising the step of: determining at least one current value of interest that is based upon the measured electrical resistance.

16. The process of claim 15, wherein the at least one current value of interest comprises any of a strain value or a stress value.

17. The process of claim 12, wherein the conductive elastomer comprises carbon-impregnated silicon.

18. The process of claim 12, further comprising the step of: comparing values for measured electrical resistance taken at least at two different times; wherein the step of providing at least one action is based at least in part upon the comparison.

19. The process of claim 12, wherein the step of providing at least one action is based at least in part on a comparison between the change in the measured electrical resistance and a predetermined threshold.

20. The process of claim 12, wherein the structure comprises any of a toy, an exercise device, a scale, a cushion, a mattress, or a seat.

21. The process of claim 12, further comprising the step of: storing the measured electrical resistance value within a memory.

22. The process of claim 12, wherein the at least one action is at least partially based on any of:
a history of the measured electrical resistance,
a history of at least one current value of interest that is based upon the measured electrical resistance,
a rate of change of the measured electrical resistance,
a rate of change of at least one current value of interest that is based upon the measured electrical resistance,
an integration of measured electrical resistance values over a period of time, or
an integration of at least one current value of interest that is based upon the measured electrical resistance over a period of time.

23. A stuffed toy, comprising:
an outer cover having a perimeter and an interior region defined therein;
stuffing located within the interior region;
a mechanism for measuring the intensity of a force that is applied uniformly across at least a portion of the perimeter of the outer cover, said mechanism for measuring comprising a conductive elastomer that is distinct from said outer cover, wherein said conductive elastomer is embedded within the interior region and affixed in a stretched state along a defined axis between two points that are extendable in length in response to the applied force thereof, said mechanism measuring the electrical resistance of the conductive elastomer when the force is applied to the toy,
where the conductive elastomer becomes further tensioned and the length of the conductive elastomer increases when the force is applied perpendicular relative to the defined axis, and
where the conductive elastomer becomes relaxed when the force is applied parallel relative to the defined axis; and
a mechanism for commanding at least one behavior of the stuffed toy in response to the measured electrical resistance.

24. The stuffed toy of claim 23, wherein the at least one behavior comprises any of a visual feedback, an auditory feedback, a haptic feedback, or a numerical readout.

25. The stuffed toy of claim 23, wherein the conductive elastomer comprises carbon-impregnated silicon.

26. The stuffed toy of claim 23, further comprising:
at least one processor;
wherein the at least one processor is programmed to determine at least one current value of interest that is based upon the measured electrical resistance.

27. The stuffed toy of claim 23, wherein the at least one current value of interest comprises any of a strain value or a stress value.

28. The stuffed toy of claim 23, further comprising:
at least one processor;
wherein the at least one processor is programmed to compare values for measured electrical resistance taken at least at two different times; and
wherein the command of the at least one behavior is based upon the comparison.

29. The stuffed toy of claim 23, further comprising:
at least one predetermined threshold;
wherein the command of the at least one behavior is based upon a comparison between the change in the measured electrical resistance and the at least one predetermined threshold.

30. The stuffed toy of claim 23, wherein the mechanism for commanding the at least one behavior is at least partially responsive to any of:
a history of the measured electrical resistance,
a history of at least one current value of interest that is based upon the measured electrical resistance,
a rate of change of the measured electrical resistance,
a rate of change of at least one current value of interest that is based upon the measured electrical resistance,
an integration of measured electrical resistance values over a period of time, or an integration of at least one current value of interest that is based upon the measured electrical resistance over a period of time.

31. The stuffed toy of claim 23, wherein the conductive elastomer is stretched along a direct path between the two points.

* * * * *